(12) United States Patent
Jin et al.

(10) Patent No.: US 10,742,407 B2
(45) Date of Patent: Aug. 11, 2020

(54) METHOD OF HYBRID SEARCHABLE ENCRYPTION AND SYSTEM USING THE SAME

(71) Applicant: Huazhong University of Science and Technology, Wuhan, Hubei (CN)

(72) Inventors: Hai Jin, Hubei (CN); Peng Xu, Hubei (CN); Tianyang Chen, Hubei (CN); Ye Tao, Hubei (CN)

(73) Assignee: Huazhong University of Science and Technology, Wuhan (CN)

( * ) Notice: Subject to any disclaimer, the term of this patent is extended or adjusted under 35 U.S.C. 154(b) by 101 days.

(21) Appl. No.: 16/207,927

(22) Filed: Dec. 3, 2018

(65) Prior Publication Data

US 2019/0229906 A1 Jul. 25, 2019

(30) Foreign Application Priority Data

Jan. 19, 2018 (CN) .......................... 2018 1 0051562

(51) Int. Cl.
*H04L 9/08* (2006.01)
*H04L 9/14* (2006.01)
*H04L 9/30* (2006.01)

(52) U.S. Cl.
CPC .............. *H04L 9/0866* (2013.01); *H04L 9/14* (2013.01); *H04L 9/3073* (2013.01)

(58) Field of Classification Search
CPC .................................................. H04L 9/0866
See application file for complete search history.

(56) References Cited

U.S. PATENT DOCUMENTS

| | | | | |
|---|---|---|---|---|
| 2008/0133935 A1* | 6/2008 | Elovici | ................... | H04L 63/08 713/193 |
| 2009/0010436 A1* | 1/2009 | Fuhr | ......................... | H04L 9/30 380/259 |

(Continued)

FOREIGN PATENT DOCUMENTS

| | | |
|---|---|---|
| CN | 101859306 | 10/2010 |
| CN | 104821876 | 8/2015 |
| CN | 105553660 | 5/2016 |

OTHER PUBLICATIONS

Peng, X., "on Provably Secure Identity-Based Encryption Scheme and Its Applications", A Dissertation Submitted in Partial Fulfillment of the Requirements for the Degree of Doctor of Philosophy in Engineering, May 2010.

*Primary Examiner* — William S Powers
(74) *Attorney, Agent, or Firm* — Michael X. Ye; Morris, Manning & Martin, LLP (57) ABSTRACT

The present invention involves with a method of hybrid searchable encryption, involving using at least one first computing device that has a first processor configured to perform steps of: using a first symmetric key to encrypt data so as to obtain a data first ciphertext, using a second symmetric key to encrypt a keyword related to the data so as to obtain a searchable keyword first ciphertext that is related to the data first ciphertext, and saving the data first ciphertext and the keyword first ciphertext in a first memory of a first computing device; and using the first symmetric key to encrypt the keyword so as to generate a keyword second ciphertext, using a first public key to encrypt the keyword so as to obtain a searchable third keyword ciphertext related to the keyword second ciphertext, and sending the keyword second ciphertext and the searchable third keyword ciphertext to a second computing device; wherein the second computing device has a second processor that is configured to perform steps of: receiving the keyword second ciphertext and the searchable third keyword ciphertext from the first computing device and saving the two together with an identification of the first computing device relationally in a second memory of the second computing device.

10 Claims, 3 Drawing Sheets

(56) References Cited

U.S. PATENT DOCUMENTS

2013/0262852 A1* 10/2013 Roeder ................. G06F 21/602
　　　　　　　　　　　　　　　　　　713/150
2014/0298009 A1* 10/2014 Hattori ................. H04L 9/3073
　　　　　　　　　　　　　　　　　　713/155
2017/0026350 A1* 1/2017 Dawoud ............... H04L 9/0637

* cited by examiner

METHOD OF HYBRID SEARCHABLE ENCRYPTION AND SYSTEM USING THE SAME

FIELD

The present invention relates to cryptography, Internet of things and cloud storage security, and more particularly to a method of hybrid searchable encryption and a system using the method.

DESCRIPTION OF THE RELATED ART

With the rapid development of Internet of things, more and more Internet-of-Things (IoT)-based devices have been used, bringing about exponentially increasing data, and in turn huge challenges to existing cloud computing technology in terms of bandwidth and processing capability. For addressing this, the concept of edge computing has been introduced as a solution. Edge computing involves placing an edge server between IoT devices and a cloud server. The edge server is designed to save and process data uploaded by the IoT devices, and provide the relevant IoT devices with feedback. With the edge server closer to the IoT devices and serving fewer IoT devices as compared to the traditional cloud-server-centered models, edge computing significantly reduces the network latency during communication with IoT devices and data processing delay, and thereby improves the speed of response. Besides, since edge server has abundant computing resources, it can run some encryption algorithms that help to improve security but are too power-consuming and performance-demanding for IoT devices to run, so as to locally encrypt and protect data uploaded by IoT devices, thereby achieving better data security. While encryption ensures data security, it is troublesome to its users. For example, when a user wants to search for a certain ciphertext from a batch of ciphertexts, he/she has to decrypt all these ciphertexts and conduct a search among them, making the process quite inefficient. This is why searchable encryption is considered as a solution. Compared to public-key encryption with keyword search (PEKS), searchable symmetric encryption (SSE) requires less computation cost and gets results faster, making it natural to deploy SSE on edge servers to support search of encrypted data.

However, another issue arises with SSE deployment on edge servers. That is, when a user wants to search using a certain keyword across all the edge servers accessible to him/her, he/she must use the symmetric keys of all these edge servers to generate SSE search trapdoors, and send the trapdoors to the corresponding edge servers. In the event that these edge servers come in a huge number, the following four serious problems can emerge: 1. an extremely long period of time is taken for the generation of all the trapdoors, degrading user search experience; 2. the generated trapdoors are of an enormous size and considerably occupy the network bandwidth of the user, and prolong network transmission, lowering user search efficiency; 3. the symmetric keys of all the edge servers have to be managed, thus requiring considerable use costs and causing additional security concerns; and 4. even if there are some edge servers not containing the ciphertext a user is looking for, these edge servers will still accept the network connection and trapdoors from the user and use the trapdoors to conduct a search, leading to unnecessary waste on computational and network resources of these edge servers. Therefore, building a secure and efficient scheme for searchable encryption in the context where a large number of edge servers are involved has become an issue to be addressed.

The objective of the present invention is to solve the foregoing problems about searchable encryption for edge computing. Based on SSE and PEKS, the inventor of the present invention has created a searchable encryption framework that can be run in the context of edge computing. With this framework, a user who wants to conduct a search simply needs to generate and submit one PEKS trapdoor to a cloud server, for the cloud server to determine which are the edge servers having the documents corresponding to the keyword the user targets and to forward the search request to the relevant edge servers for execution, thereby making the search and operation of the edge servers more efficient. Meanwhile, during this process, the user doesn't have to manage the symmetric keys of the edge servers, so the use costs can be significantly reduced.

SUMMARY OF THE INVENTION

In view of the shortcomings of the prior art, the present invention provides a method of hybrid searchable encryption and a system using the method. The present invention allows efficient searchable encryption in a system covering a large number of first computing devices, for example, such as a large number of edge servers performing edge computing in a cloud-edge computing application. The present invention combines SSE and PEKS in ingenious architecture to effectively reduce costs for use the system and for its first computing device to run, thereby improving search efficiency and providing excellent practicality.

The present invention discloses a method of hybrid searchable encryption involving using at least one first computing device that has a first processor configured to perform steps of: using a first symmetric key to encrypt a data so as to obtain a first data ciphertext, using a second symmetric key to encrypt a keyword related to the data so as to obtain a searchable first keyword ciphertext that is related to the first data ciphertext, and saving the first data ciphertext and the symmetric key to encrypt a keyword related to the data so as to obtain a searchable first keyword ciphertext that is related to the first data ciphertext, and saving the first data ciphertext and the first keyword ciphertext in a first memory of a first computing device; and using the first symmetric key to encrypt the keyword so as to generate a second keyword ciphertext, using a first public key to encrypt the keyword so as to obtain a searchable third keyword ciphertext related to the second keyword ciphertext, and sending the second keyword ciphertext and the searchable third keyword ciphertext to a second computing device; wherein the second computing device has a second processor that is configured to perform steps of: receiving the second keyword ciphertext and the searchable third keyword ciphertext from the first computing device and saving the two together with an identification of the first computing device relationally in a second memory of the second computing device.

According to a preferred mode, a third processor is configured to perform steps of: when inputting the corresponding keyword and a first private key that has been paired with the first public key, outputting a first search trapdoor and sending the first search trapdoor to the second computing device.

According to a preferred mode, the second processor is further configured to perform steps of: when receiving the first search trapdoor from the third processor, inputting a searchable third keyword ciphertext set composed of the first search trapdoor and plural searchable third keyword ciphertexts and outputting the corresponding second keyword ciphertext, and feeding the corresponding second keyword ciphertext back to the corresponding first computing device it belongs to.

According to a preferred mode, the first processor is further configured to perform steps of: when receiving the corresponding second keyword ciphertext from the second processor, using the first symmetric key to do decryption and retrieve the corresponding keyword; and inputting the retrieved corresponding keyword and the second symmetric key, and outputting a second search trapdoor; and inputting a first keyword ciphertext set composed of the second search trapdoor and plural first keyword ciphertexts, and outputting the corresponding first data ciphertext; and inputting the corresponding first data ciphertext and the first symmetric key, and outputting a plaintext of the data related to the corresponding keyword; and inputting the plaintext of the data related to the corresponding keyword and a second public key, and outputting a corresponding second data ciphertext and send it to the second computing device.

According to a preferred mode, the second processor is further configured to perform steps of: receiving the corresponding second data ciphertext and forwarding it to a third computing device.

According to a preferred mode, the third processor is further configured to perform steps of: receiving the corresponding second data ciphertext from the second processor and saving it in a third memory; and inputting the corresponding second data ciphertext and a second private key paired with the second public key, and outputting the plaintext of the corresponding data related to the corresponding keyword.

According to a preferred mode, the first processor of each first computing device is configured to perform a step of: independently generating the first symmetric key and/or the second symmetric key.

According to a preferred mode, the first computing device is an edge server, the second computing device is a cloud server, and the third computing device is a user.

The present invention further discloses a system of hybrid searchable encryption, comprising a first computing device, a second computing device, and a third computing device, wherein the system comprises at least one first computing device (1), the first computing device has a first processor configured to perform steps of:
using a first symmetric key to encrypt a data so as to obtain a first data ciphertext, using a second symmetric key to encrypt a keyword related to the data so as to obtain a searchable first keyword ciphertext that is related to the first data ciphertext, and saving the first data ciphertext and the first keyword ciphertext in a first memory of a first computing device; and
using the first symmetric key to encrypt the keyword so as to generate a second keyword ciphertext, using a first public key to encrypt the keyword so as to obtain a searchable third keyword ciphertext related to the second keyword ciphertext, and sending the second keyword ciphertext and the searchable third keyword ciphertext to a second computing device;
wherein the second computing device has a second processor that is configured to perform steps of: receiving the second keyword ciphertext and the searchable third keyword ciphertext from the first computing device and saving the two together with an identification of the first computing device relationally in a second memory of the second computing device.

The present invention further discloses a method of hybrid searchable encryption, comprise:
an edge server using a user public key Pk to encrypt a keyword W, outputting a PEKS ciphertext $C_W$ of the keyword W, and uploading it to a cloud server in a way that it is related to the edge server;
the cloud server, when a user uses the keyword W to initiate a search request, identifying, through the PEKS ciphertext $C_W$, the corresponding edge server that has uploaded the keyword W, and forwarding the search request to the corresponding edge server for execution; and the corresponding edge server executing a search according to the search request, encrypting the data using the user public key Pk, and uploading the data to the cloud server, and the cloud server forwarding the data to the user.

The present invention provides a method of hybrid searchable encryption and a system using the method, and at least has the following advantages:
(1) The third computing device, when conducting search, only has to generate and submit one PEKS search trapdoor to the second computing device, and then the second computing device determines which first computing devices have the documents corresponding to the keyword the user targets, and forwards the search request to the corresponding first computing device for execution, thereby making the search of the user and operation of the edge servers more efficient;
(2) Each first computing device may have its exclusive first symmetric key and second symmetric key, thereby ensuring security of the saved data; and
(3) The second computing device and the third computing device do not have to manage the symmetric key of the first computing device, and this not only greatly reduces the computing load and costs of the second and third computing devices, but also allows each first computing device to save data more securely and independently.

DETAILED DESCRIPTIONS OF THE INVENTION

The following description, in conjunction with the accompanying drawings and preferred embodiments, is set forth as below to illustrate the present invention.

It is noted that, for easy understanding, like features bear similar labels in the attached figures as much as possible.

As used throughout this application, the term "may" is of permitted meaning (i.e., possibly) but not compulsory meaning (i.e., essentially). Similarly, the terms "comprising", "including" and "consisting" mean "comprising but not limited to".

The phrases "at least one", "one or more" and "and/or" are for open expression and shall cover both connected and separate operations. For example, each of "at least one of A, B and C", "at least one of A, B or C", "one or more of A, B and C", "A, B or C" and "A, B and/or C" may refer to A solely, B solely, C solely, A and B, A and C, B and C or A, B and C.

The term "a" or "an" article refers to one or more articles. As such, the terms "a" (or "an"), "one or more" and "at least one" are interchangeable herein. It is also to be noted that the term "comprising", "including" and "having" used herein are interchangeable.

As used herein, the term "automatic" and its variations refer to a process or operation that is done without physical, manual input. However, where the input is received before the process or operation is performed, the process or operation may be automatic, even if the process or operation is performed with physical or non-physical manual input. If such input affects how the process or operation is performed, the manual input is considered physical. Any manual input that enables performance of the process or operation is not considered "physical".

Some terms referred to in the present invention are defined first as below.

A cloud server has the functions of storing PEKS ciphertexts, conducting PEKS search as well as receiving data ciphertexts of edge servers and transmitting them to a user.

An edge server has the functions of generating data ciphertexts and their corresponding SSE searchable ciphertexts, generating PEKS ciphertexts of keywords, receiving encrypted keywords from a cloud server and conducting SSE search locally and decrypting data ciphertexts and re-encrypting them using a public key of a user.

A user has the functions of generating PEKS trapdoors, receiving data ciphertexts form a cloud server, and decrypting them.

SSE stands for Searchable Symmetric Encryption, and is defined as follows:
1. $K_{SSE} \leftarrow \text{Setup}_{SSE}(s)$: inputting a security parameter s, and generating a second symmetric key $K_{SSE}$;
2. $C \leftarrow \text{Encrypt}_{SSE}(K_{SSE}, D, W)$: inputting the generated second symmetric key $K_{SSE}$, a document identifier D and a keyword W, and outputting a searchable ciphertext C corresponding to the keyword W, which in this case refers to the first keyword ciphertext;
3. $td_{SSE} \leftarrow \text{Trapdoor}_{SSE}(K_{SSE}, W)$: inputting the second symmetric key $K_{SSE}$ and the keyword W, and outputting a second search trapdoor $td_{SSE}$ corresponding to the keyword W; and
4. $S_D \leftarrow \text{Search}_{SSE}(td_{SSE}, S_C)$: inputting the second search trapdoor $td_{SSE}$ and a set $S_C$ comprising all the searchable ciphertexts C, and outputting a document identifier set $S_D$ corresponding to the keyword.

PEKS stands for Public Encryption with Keyword Search and is defined as follows:
1. $(Pk_{PEKS}, Sk_{PEKS}) \leftarrow \text{Setup}_{PEKS}(s)$: inputting a security parameter s, and outputting a first public key $Pk_{PEKS}$ and a first private key $Sk_{PEKS}$;
2. $C \leftarrow \text{Encrypt}_{PEKS}(Pk_{PEKS}, D, W)$: inputting the first public key $Pk_{PEKS}$, a document identifier D and a keyword W, and outputting a searchable ciphertext C corresponding to the keyword W, which in this case refers to the searchable third keyword ciphertext;
3. $td_{PEKS} \leftarrow \text{Trapdoor}_{PEKS}(Sk, W)$: inputting the first private key $Sk_{PEKS}$ and the keyword W, and outputting a first search trapdoor $td_{PEKS}$ corresponding to the keyword W; and
4. $S_D \leftarrow \text{Search}_{PEKS}(td_{PEKS}, S_C)$: inputting the first search trapdoor $td_{PEKS}$ and a set $S_C$ comprising all the searchable ciphertexts C, and outputting a document identifier set $S_D$ corresponding to the keyword.

While PEKS and SSE are similar in their definitions, they are used in totally different applications. SSE is suitable for applications where there is only one user, and the user only search among his/her own documents, PEKS is suitable for applications where there are plural users sending encrypted documents to one receiver.

SE stands for Symmetric Encryption, which is a data encryption algorithm and is defined as follows:
1. $K_{SE} \leftarrow \text{Setup}_{SE}(s)$: inputting a security parameter s, and probabilistically generating a first symmetric key $K_{SE}$;
2. $C \leftarrow \text{Encrypt}_{SE}(K_{SE}, P)$: inputting the key K and a plaintext P, and probabilistically outputting a ciphertext C; and
3. $P \leftarrow \text{Decrypt}_{SE}(K_{SE}, C)$: inputting the key K and the ciphertext C, and deterministically outputting the plaintext P.

PKE stands for Public Key Encryption, which is a data encryption algorithm and is defined as follows:
1. $(Pk_{PKE}, Sk_{PKE}) \leftarrow \text{Setup}_{PKE}(s)$: inputting a security parameter s and probabilistically outputting a second public key $Pk_{PKE}$ and a second private key $Sk_{PKE}$;
2. $C \leftarrow \text{Encrypt}_{PKE}(Pk_{PKE}, P)$: inputting the second public key $Pk_{PKE}$ and a plaintext P, and probabilistically outputting a ciphertext C; and
3. $P \leftarrow \text{Decrypt}_{PKE}(Sk_{PKE}, C)$: inputting second private key $Sk_{PKE}$ and a ciphertext C, deterministically outputting a plaintext P.

The difference between PKE and SE is just the same as the difference between SSE and PEKS. In a system based on private key encryption, there is usually one user encrypting and decrypting data. In a system based on public key encryption, there are usually plural users sending encrypted data to a receiver.

Embodiment 1

Figure 1:
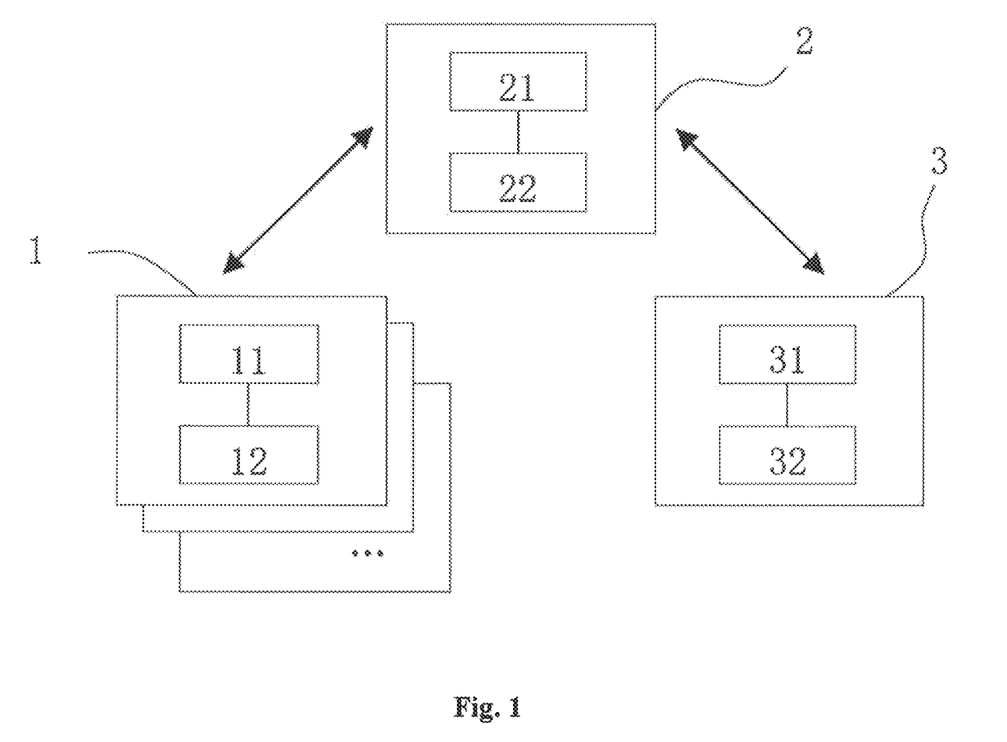
FIG. 1 is a module diagram of a preferred mode of the system of the present invention.
Figure 2:
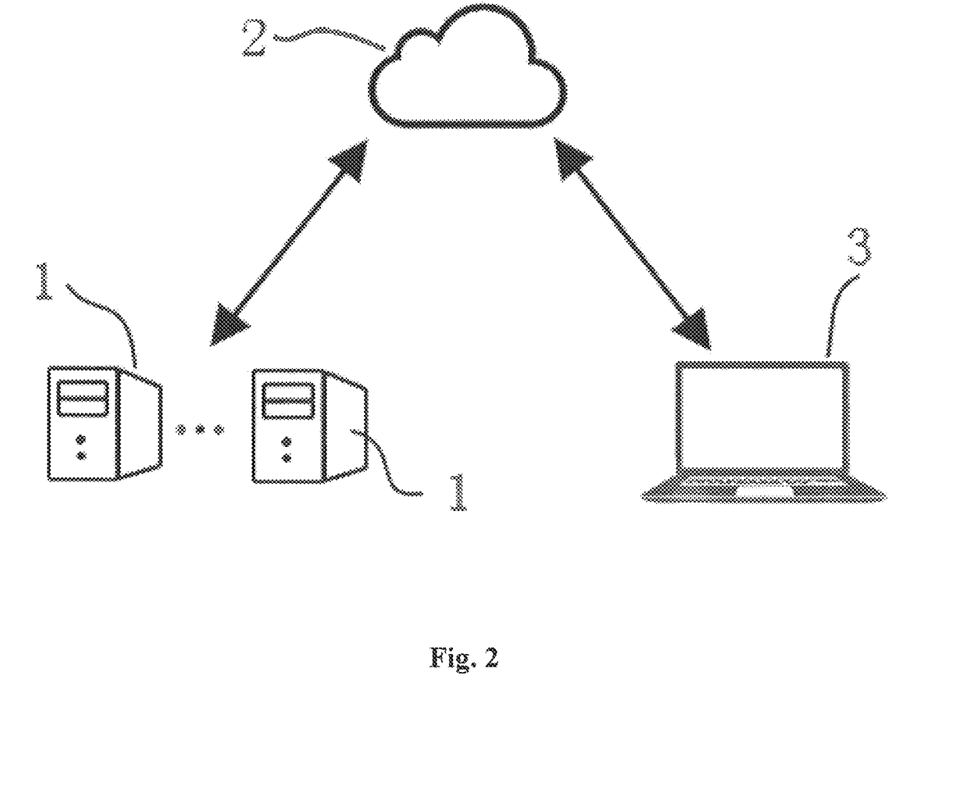
FIG. 2 is a structure diagram of a preferred mode of the system of the present invention.

Referring to FIG. 1, the present embodiment discloses a method of hybrid searchable encryption. Without causing conflicts or contradiction, the preferred modes for other embodiments may be incorporated into the present embodiment as supplement.

The present embodiment discloses a method of hybrid searchable encryption, comprises at least one first computing device 1. The first processor 11 of the first computing device 1 may be configured to perform the steps of:

using a first symmetric key to encrypt data so as to obtain a first data ciphertext, using a second symmetric key to encrypt a keyword related to the data so as to obtain a searchable first keyword ciphertext that is related to the first data ciphertext, and saving the first data ciphertext and the first keyword ciphertext in a first memory 12 of a first computing device 1. In the present invention, the first computing device uses the first symmetric key to encrypt data, and uses the second symmetric key based on the searchable symmetric encryption algorithm to encrypt the keyword related to the data to keep the data in the first computing device 1 safely.

According to a preferred mode, the first processor 11 may further be configured to perform steps of: using the first symmetric key to encrypt the keyword so as to generate a second keyword ciphertext, using a first public key to encrypt the keyword so as to obtain a searchable third keyword ciphertext related to the second keyword ciphertext, and sending the second keyword ciphertext and the searchable third keyword ciphertext to a second computing device 2. In this way, the keyword can be sent to the second computing device 2 in an encrypted form. The entire search process can be completed without the second computing device 2 having knowledge about the exact keyword to be searched. This significantly improves the security for data search. In addition, it is not necessary for the first computing device 1 to pre-upload all the data to the second computing device 2, so as to greatly reduce the storage costs for the second computing device. Preferably, before the first processor 11 generates the searchable third keyword ciphertext, it uses a first symmetric key to encrypt keyword and generate a second keyword ciphertext $CW_{SE}$, extracts the identifier $D_{CW_{SE}}$ of the keyword second ciphertext, and runs the algorithm $CW_{PEKS} \leftarrow Encrypt_{PEKS}(Pk_{PEKS}, D_{CW_{SE}}, W)$ to obtain the searchable third keyword ciphertext. Afterward, the first computing device 1 uploads $CW_{SE}$, as additional encrypted data of $CW_{PEKS}$, to the second computing device 2, together with $CW_{PEKS}$.

According to a preferred mode, the second processor 21 of the second computing device 2 may be configured to perform steps of: receiving the second keyword ciphertext and the searchable third keyword ciphertext from the first computing device 1 and saving the two together with an identification of the first computing device 1 relationally in a second memory 22 of the second computing device 2. In this way, when a user, such as the third computing device 3, initiates a search request with the first private key and the corresponding keyword, it may merely generate one PEKS search trapdoor, namely the first search trapdoor, and the second computing device 2 identifies the corresponding second keyword ciphertext and the corresponding first computing device. The corresponding second keyword ciphertext is then fed back to the corresponding first computing device, that is, the corresponding second keyword ciphertext is sent to the source device that uploaded it to the second computing device 2. This allows generation of the second search trapdoor on only the corresponding first computing device, instead of generation of trapdoors on all the first computing devices, thereby significantly reducing computational costs and improving the retrieval efficiency of the system. Preferably, the first symmetric key is based on the symmetric encryption algorithm SE, and the second symmetric key is based on the searchable symmetric encryption algorithm SSE.

According to a preferred mode, a third processor 31 is configured to perform steps of: when inputting the corresponding keyword and the first private key paired with the first public key, outputting a first search trapdoor and sending the first search trapdoor to the second computing device 2. The third processor, which receives data, uses the first private key to search the keyword. The first private key may be kept privately opposite to being shared by different users like a symmetric key. This helps to make search of the keyword more private and more secure. Preferably, the first public key and the first private key are based on the public-key encryption with keyword search algorithm PEKS. Preferably, the first public key and the first private key may be generated by the third computing device 3. The first public key may be published. The first private key may be kept by the third computing device 3 privately.

According to a preferred mode, the second processor 21 is further configured to perform steps of: when receiving the first search trapdoor from the third processor 31, inputting a searchable third keyword ciphertext set composed of the first search trapdoor and plural searchable third keyword ciphertexts and outputting the corresponding second keyword ciphertext, and feeding the corresponding second keyword ciphertext back to the corresponding first computing device 1 it belongs to. In this way, the second processor 21 may designate the first computing devices having the corresponding keyword, and only the designated first computing devices generate the second search trapdoor. In a case where a large number of first computing devices are involved, this significantly improves retrieval efficiency. Moreover, the second search trapdoor is different from the first search trapdoor that is encrypted using a searchable public key, yet it is based on a searchable symmetric encryption algorithm, so the computational load is further lowered, thereby further improving retrieval efficiency.

According to a preferred mode, the first processor 11 may further be configured to perform steps of: when receiving the corresponding second keyword ciphertext from the second processor 21, using the first symmetric key to do decryption and retrieve the corresponding keyword; and inputting the retrieved corresponding keyword and the second symmetric key, and outputting a second search trapdoor; and inputting a first keyword ciphertext set composed of the second search trapdoor and plural first keyword ciphertexts, and outputting the corresponding first data ciphertext; and inputting the corresponding first data ciphertext and the first symmetric key, and outputting a plaintext of the data related to the corresponding keyword; and inputting the plaintext of the data related to the corresponding keyword and a second public key, and outputting a corresponding second data ciphertext and send it to the second computing device 2. Preferably, the second public key and the second private key may be based on the public key encryption algorithm PKE.

According to a preferred mode, the second processor 21 may further be configured to perform steps of: receiving the corresponding second data ciphertext and forwarding it to the third computing device 3. Preferably, the second computing device 2 may send the second data ciphertext to the third computing device 3 directly. Alternatively, the second computing device may send it to the third computing device 3 indirectly through an intermediary. Preferably, the second memory 22 of the second computing device 2 only stores the corresponding second data ciphertext temporarily, so as to reduce the storage costs of the second computing device 2 and prevent unauthorized access to the corresponding data second ciphertext from the second computing device 2 and data breaches. The second processor 21 may further be configured to perform steps of: when detecting that the third computing device 3 has successfully received the corresponding second data ciphertext, deleting the corresponding second data ciphertext stored in the second memory 22.

According to a preferred mode, the second processor 21 may further be configured to perform steps of: before sending the second data ciphertext to the third computing device 3, checking whether the environment of the third computing device 3 is secure, and when the environmental security of the third computing device 3 is below a predetermined security threshold, refusing to send the second data ciphertext to the third computing device 3. Check of the environmental security helps to prevent data breaches caused by sending data to the third computing device 3 that operates in an unsecure environment, thereby improving security of data transmission. Herein, the phrase "environmental security" refers to the security of the environment in which the third computing device 3 operates.

According to a preferred mode, the third processor 31 may further be configured to perform steps of: receiving the corresponding second data ciphertext from the second processor 21 and saving it in a third memory 32; and inputting the corresponding second data ciphertext and a second private key paired with the second public key, and outputting the plaintext of the corresponding data related to the corresponding keyword. In this way, only the third computing device 3 having the second private key can decrypt the second data ciphertext, thereby significantly improving data security. Preferably, the second public key and the second private key may be generated by the third computing device 3. The second public key may be published. The second key is kept by the third computing device 3 privately.

According to a preferred mode, the first processor 11 of each first computing device 1 may be configured to perform a step of: independently generating the first symmetric key and/or the second symmetric key. Preferably, the first symmetric key and/or second symmetric key may be similarly generated by a key distribution center. The key distribution center may be a device of an independent third party. The key distribution center may generate a first symmetric key and/or a second symmetric key exclusively for each first computing device 1. The key is then sent to each first computing device 1 through an encrypted, secure channel. In this way, the work of each first computing device 1 can be simplified, and their computational load can be mitigated. The key distribution center may further generate the first public key and the first private key for the third computing device 3, The key distribution center may further generate the second public key and the second private key for the third computing device 3.

Preferably, in the present embodiment, the first symmetric key may correspond to $K_{SE}$ as referred elsewhere in the present application.

Preferably, in the present embodiment, the second symmetric key may correspond to $K_{SSE}$ as referred elsewhere in the present application.

Preferably, in the present embodiment, the first public key may correspond to $Pk_{PEKS}$ as referred elsewhere in the present application.

Preferably, in the present embodiment, the first private key may correspond to $Sk_{PEKS}$ as referred elsewhere in the present application $Sk_{PEKS}$.

Preferably, in the present embodiment, the second public key may correspond to $Pk_{PKE}$ as referred elsewhere in the present application.

Preferably, in the present embodiment, the second private key may correspond to $Sk_{PKE}$ as referred elsewhere in the present application.

Preferably, in the present embodiment, the first datum ciphertext may correspond to $C_{SE}$ as referred elsewhere in the present application.

Preferably, in the present embodiment, the second datum ciphertext may correspond to $C_{PKE}$ as referred elsewhere in the present application.

Preferably, in the present embodiment, the first keyword ciphertext may correspond to $CW_{SSE}$ as referred elsewhere in the present application.

Preferably, in the present embodiment, the second keyword ciphertext may correspond to $CW_{SE}$ as referred elsewhere in the present application.

Preferably, in the present embodiment, the searchable third keyword ciphertext may correspond to $CW_{PEKS}$ as referred elsewhere in the present application.

Preferably, in the present embodiment, the first search trapdoor may correspond $td_{PEKS}$ as referred elsewhere in the present application.

Preferably, in the present embodiment, the second search trapdoor may correspond to $td_{SSE}$ as referred elsewhere in the present application.

According to a preferred mode, the first computing device 1 may be an edge server. The second computing device 2 may be a cloud server. The third computing device 3 may be a user or a client. In the present invention, the cloud server conducts PEKS search as well as temporary storage and forwarding of the edge server ciphertexts, thereby allowing the user or the client to have a simplified user interface, and providing transmission resuming using the cloud server to create improved user experience.

According to another preferred mode, the first computing devices 1 are each a first working computer accessible to all employees in an enterprise, and the second computing device 2 is a central server, while the third computing devices 3 are each a second working computer only accessible to authorized management. With such an arrangement, the management can check the encrypted data of any of the employees to know how his/her work progresses, yet the encrypted data of different employees are isolated from each other. This enables the enterprise to have improved secrecy. The present invention may be applied to other scenarios as exemplificatively described herein. It is to be noted, however, that any use embodying the concept of the present invention shall be deemed as falling within the scope of the present invention.

Embodiment 2

The present embodiment is further improvement based on Embodiment 1, and the repeated description is omitted herein. Without causing conflicts or contradiction, the preferred modes for other embodiments may be incorporated into the present embodiment as supplement.

Referring to FIG. 1 again, the present invention further discloses a system of hybrid searchable encryption. The system is suitable for implementing the steps of the method of the present invention, so as to achieve the expected technical effects.

According to a preferred mode, the system may comprise a first computing device 1, a second computing device 2, and a third computing device 3. The system may comprise at least one said first computing device 1. The first computing device 1 has a first processor 11 that may be configured to perform steps of:

using a first symmetric key to encrypt a data so as to obtain a data first ciphertext, using a second symmetric key to encrypt a keyword related to the data so as to obtain a searchable first keyword ciphertext that is related to the first data ciphertext, and saving the first data ciphertext and the first keyword ciphertext in a first memory 12 of a first computing device 1; and using the first symmetric key to encrypt the keyword so as to generate a keyword second ciphertext, using a first public key to encrypt the keyword so as to obtain a searchable third keyword ciphertext related to the second keyword ciphertext, and sending the second keyword ciphertext and the searchable third keyword ciphertext to a second computing device 2;

wherein the second computing device 2 has a second processor 21 that is configured to perform steps of: receiving second keyword ciphertext and the searchable third keyword ciphertext from the first computing device 1 and saving the two together with an identification of the first computing device 1 relationally in a second memory 22 of the second computing device 2.

Embodiment 3

The present embodiment is further improvement based on Embodiment 1, 2 or a combination thereof, and the repeated description is omitted herein. Without causing conflicts or contradiction, the preferred modes for other embodiments may be incorporated into the present embodiment as supplement.

The present embodiment discloses a method of hybrid searchable encryption.

According to a preferred mode, the disclosed method may comprise: an edge server using a user public key Pk to encrypt a keyword W, outputting a PEKS ciphertext $C_W$ of the keyword W, and uploading it to a cloud server in a way that it is related to the edge server.

According to a preferred mode, the disclosed method may further comprise: the cloud server, when a user uses the keyword W to initiate a search request, identifying, through the PEKS ciphertext $C_W$, the corresponding edge server that has uploaded the keyword W, and forwarding the search request to the corresponding edge server for execution.

According to a preferred mode, the disclosed method may further comprise: the corresponding edge server executing a search according to the search request, encrypting the data using the user public key Pk, and uploading the data to the cloud server, and the cloud server forwarding the data to the user.

According to a preferred mode, the step of an edge server using a user public key Pk to encrypt a keyword W, outputting a PEKS ciphertext $C_W$ of the keyword W, and uploading it to a cloud server in a way that it is related to the edge server may comprise:

the edge server inputting a symmetric key $K=(K_{SSE}, K_{SE})$, data and the keyword W corresponding to the data, and outputting the SE ciphertext $C_{SE}$ of the data and the SSE ciphertext $CW_{SSE}$ of the keyword W, and saving them locally; and the edge server inputting the keyword W, $K_{SE}$ and a first public key $Pk_{PEKS}$ of the user public key Pk, and outputting the PEKS ciphertext $C_W=(CW_{PEKS}, CW_{SE})$ of the keyword W, and uploading them to the cloud server; wherein $K_{SE}$ is a first symmetric key based on the symmetric encryption algorithm SE, for performing symmetric encryption on the data and generating the SE ciphertext $C_{SE}$ of the data; $K_{SSE}$ is a second symmetric key based on the searchable symmetric encryption algorithm SSE, for performing encryption on the keyword, and generating the SSE searchable ciphertext $CW_{SSE}$ of the keyword W; $CW_{PEKS}$ is the PEKS searchable ciphertext of the keyword generated using the first public key $Pk_{PEKS}$; and $CW_{SE}$ is the SE ciphertext of the keyword W generated from $K_{SE}$ using the symmetric encryption algorithm.

According to a preferred mode, the symmetric key $K=(K_{SSE}, K_{SE})$ inputted by each edge server is generated by the respective edge server separately.

According to a preferred mode, the step of the edge server inputting the keyword W, $K_{SE}$ and a first public key $Pk_{PEKS}$ of the user public key Pk, and outputting the PEKS ciphertext $C_W=(CW_{PEKS}, CW_{SE})$ of the keyword W, and uploading them to the cloud server may comprise: the edge server inputting the symmetric key $K_{SE}$ and the keyword W, running the algorithm $CW_{SE} \leftarrow Encrypt_{SE}(K_{SE}, W)$ to obtain the encrypted keyword ciphertext $CW_{SE}$ and the keyword ciphertext document identifier $D_{CW_{SE}}$;
inputting the PEKS public key $Pk_{PEKS}$ of the user, the keyword ciphertext document identifier $D_{CW_{SE}}$ and the keyword W, running the algorithm $CW_{PEKS} \leftarrow Encrypt_{PEKS}(Pk_{PEKS}, D_{CW_{SE}}, W)$ to obtain the PEKS searchable ciphertext of the keyword W; and the edge server taking $CW_{SE}$ as the encrypted data attached to the PEKS searchable ciphertext $CW_{PEKS}$ and uploading it to the cloud server in the form of $C_W=(CW_{PEKS}, CW_{SE})$.

According to a preferred mode, the step of when a user initiates a search request using the keyword W, the cloud server using the PEKS ciphertext $C_W$ to identify the corresponding edge server that uploaded the keyword W, and forwarding the search request to the corresponding edge server for execution may comprise: the user inputting the keyword W and a first private key $Sk_{PEKS}$ of the user private key Sk, outputting the PEKS search trapdoor $td_{PEKS}$, and uploading it to the cloud server; the cloud server inputting the PEKS search trapdoor $td_{PEKS}$, outputting n PEKS ciphertext $(C_W^1, C_W^2, \ldots, C_W^n)$, and sending $C_W^i (1 \leq i \leq n)$ to the corresponding edge servers that uploaded $C_W^i$, respectively, wherein n is an positive integer; the corresponding edge server splitting the received PEKS ciphertext $C_W^i$ into $C_W^i = (C_{PEKS}^i, CW_{SE}^i)$, inputting the SE ciphertext $CW_{SE}^i (1 \leq i \leq n)$ of the encrypted keyword W and the symmetric key $K_{SE}$, and decrypting the keyword W; the corresponding edge server inputting the decrypted keyword W and the key $K_{SSE}$, and outputting the SSE search trapdoor $td_{SSE}$; the corresponding edge server inputting the generated SSE search trapdoor $td_{SSE}$, and outputting the corresponding data ciphertext $C_{SE}$; wherein, the first private key $Sk_{PEKS}$ is a PEKS private key, for generating the PEKS search trapdoor $td_{PEKS}$.

According to a preferred mode, the step of the corresponding edge server executing a search according to the search request, encrypting the data using the user public key Pk, and uploading the data to the cloud server, and the cloud server forwarding the data to the user may comprise: the corresponding edge server inputting the symmetric key $K_{SE}$ and the data ciphertext $C_{SE}$ and outputting the data plaintext P; the corresponding edge server inputting the second public key $Pk_{PKE}$ of the user public key Pk and the data plaintext P, outputting the ciphertext $C_{PKE}$, and uploading it to the cloud server; the cloud server receiving the ciphertext $C_{PKE}$ from the corresponding edge server, and sending it to the user; wherein, the second public key $Pk_{PKE}$ is a public key based on the public key encryption algorithm, for encryption of the data plaintext P.

According to a preferred mode, the method may further comprise: the user inputting the ciphertext $C_{PKE}$ and the second private key $Sk_{PKE}$ of the user private key, running the algorithm $P \leftarrow Decrypt_{PKE}(Sk_{PKE}, C_{PKE})$, and outputting the data plaintext P.

Preferably, the second private key $Sk_{PKE}$ is a private key based on the public key encryption algorithm, for decryption of the data encrypted using the second public key $Pk_{PKE}$.

According to a preferred mode, the user public key Pk and the user private key Sk are generated by the user. The user runs the first algorithm $(Pk_{PEKS}, Sk_{PEKS}) \leftarrow Setup_{PEKS}(s_{PEKS})$ to generate the first public-private key pair $(Pk_{PEKS}, Sk_{PEKS})$ based on the PEKS algorithm and run the second algorithm $(Pk_{PKE}, Sk_{PKE}) \leftarrow Setup_{PKE}(s_{PKE})$ to generate the second public-private key pair $(Pk_{PKE}, Sk_{PKE})$ based on PKE algorithm, so as to obtain the user public key $Pk=(Pk_{PEKS}, Pk_{PKE})$ and the user private key $Sk=(Sk_{PEKS}, Sk_{PKE})$.

Embodiment 4

The present embodiment is further improvement based on Embodiment 1, 2, 3 or a combination thereof, and the repeated description is omitted herein. Without causing conflicts or contradiction, the preferred modes for other embodiments may be incorporated into the present embodiment as supplement.

The present embodiment further discloses a system of hybrid searchable encryption. The system is suitable for implementing the steps of the method of the present invention, so as to achieve the expected technical effects.

According to a preferred mode, the system may comprise s cloud server, an edge server and a user. The edge server used a user public key Pk to encrypt a keyword W, outputs a PEKS ciphertext $C_W$ of the keyword W, and upload it to the cloud server in a way that it is related to the edge server.

When the user initiates a search request using the keyword W, the cloud server uses the PEKS ciphertext $C_W$ to identify the corresponding edge server that uploaded the keyword W, and forwards the search request to the corresponding edge server for execution.

The corresponding edge server conducts search according to the search request, encrypts the data using the user public key Pk, and uploads it to the cloud server. Then the cloud server forwards it to the user.

According to a preferred mode, the step of an edge server using a user public key Pk to encrypt a keyword W, outputting a PEKS ciphertext $C_W$ of the keyword W, and uploading it to the cloud server in a way that it is related to the edge server may comprise:

the edge server inputting the symmetric key $K=(K_{SSE}, K_{SE})$, the data and the keyword W corresponding to the data, outputting an SE ciphertext $C_{SE}$ of the data and an SSE ciphertext $CW_{SSE}$ of the keyword W, and storing them locally;

the edge server inputting the keyword W, $K_{SE}$ and the first public key $Pk_{PEKS}$ of the user public key Pk, and outputting the PEKS ciphertext $C_W=(CW_{PEKS}, CW_{SE})$ of the keyword W;

the edge server uploading the PEKS ciphertext $C_W$ of the keyword W to the cloud server.

Preferably, $K_{SE}$ is the first symmetric key based on the symmetric encryption algorithm SE, for performing symmetric encryption on the data and generating the SE ciphertext $C_{SE}$ of the data; $K_{SSE}$ is the second symmetric key based on the searchable symmetric encryption algorithm SSE, for performing encryption on the keyword, and generating SSE searchable ciphertext $CW_{SSE}$ of the keyword W; the $CW_{PEKS}$ is the PEKS searchable ciphertext of the keyword W generated using the first public key $Pk_{PEKS}$; and the $CW_{SE}$ is the SE ciphertext of the keyword W generated using the $K_{SE}$ based on the symmetric encryption algorithm.

Embodiment 5

The present embodiment is further improvement based on Embodiment 1, 2, 3, 4 or a combination thereof, and the repeated description is omitted herein. Without causing conflicts or contradiction, the preferred modes for other embodiments may be incorporated into the present embodiment as supplement.

Figure 3:
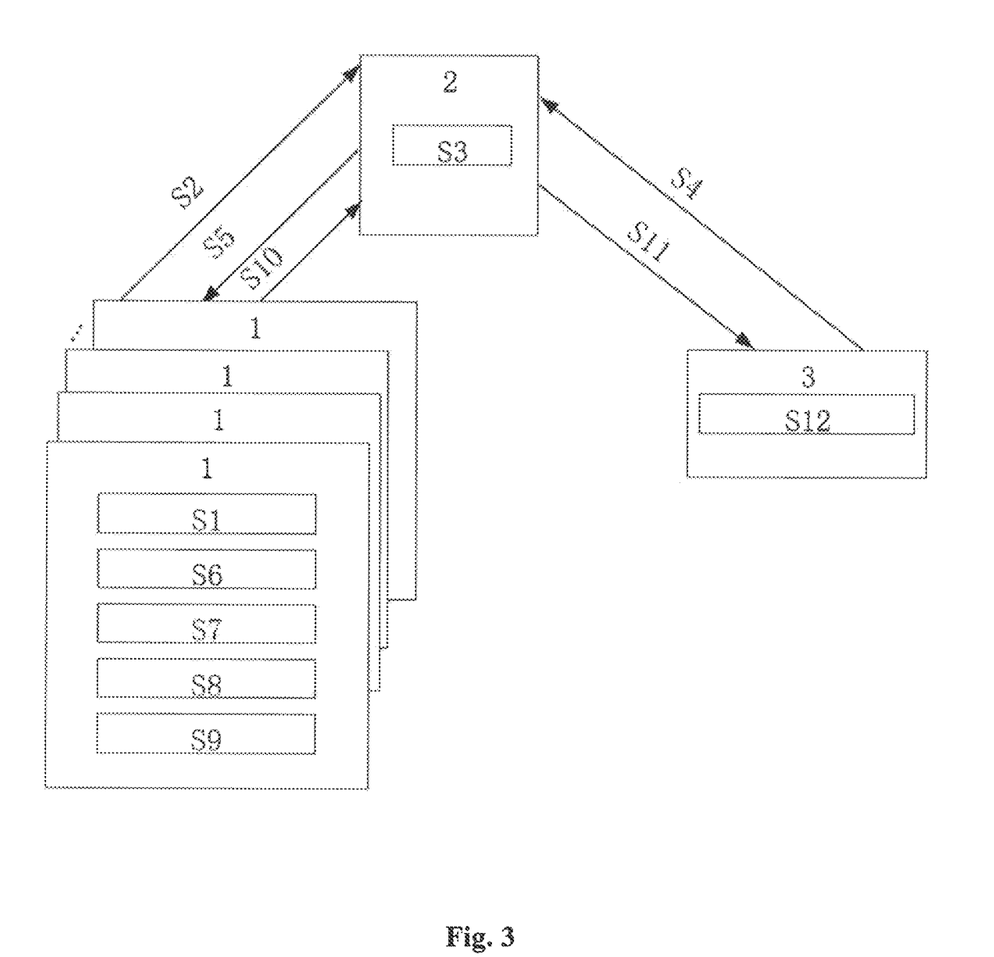
FIG. 3 is a flowchart of a preferred mode of the method of the present invention.

Referring to FIG. 3, the present embodiment discloses a method of hybrid searchable encryption, and the method may comprise the following steps:

S1: the edge server inputting a symmetric key K, data and a corresponding keyword W, and outputting the SE ciphertext $C_{SE}$ of the data and the SSE ciphertext $CW_{SSE}$ of the keyword;

S2: the edge server inputting the keyword W and a user public key Pk, outputting the PEKS ciphertext ($C_{PEKS}$, $CW_{SE}$) of the keyword W, and uploading it to the cloud server;

S3: the cloud server saving the PEKS ciphertext ($C_{PEKS}$, $CW_{SE}$) uploaded by the edge server;

S4: the user inputting the keyword W and $Sk_{PEKS}$, outputting the PEKS search trapdoor $td_{PEKS}$, and uploading it to the cloud server;

S5: the cloud server inputting the PEKS search trapdoor $td_{PEKS}$, outputting n keyword ciphertexts $CW_{SE}^1 (1 \leq i \leq n)$, and sending them to the edge server that has uploaded the keyword;

S6: the edge server inputting the encrypted keyword $CW_{SE}^1$ ($1 \leq i \leq n$) and the symmetric key $K_{SE}$, and decrypting the keyword W;

S7: the edge server inputting the keyword W and the key $K_{SSE}$ decrypted in S6, and outputting the SSE search trapdoor $td_{SSE}$;

S8: the edge server inputting the SSE search trapdoor $td_{SSE}$ generated in S7, and outputting the corresponding data ciphertext $C_{SE}$;

S9: the edge server inputting the symmetric key $K_{SE}$ and the data ciphertext $C_{SE}$, and outputting the data plaintext;

S10: the edge server inputting the user public key $Pk_{PKE}$ and the data plaintext P, outputting the ciphertext $C_{PKE}$ and uploading it to the cloud server;

S11: the cloud server receiving the ciphertext $C_{PKE}$ from the edge server, and sending it to the user; and S12: the user inputting the ciphertext $C_{PKE}$ and the private key $Sk_{PKE}$, and outputting the data plaintext.

Embodiment 6

The present embodiment is further improvement based on Embodiment 1, 2, 3, 4, 5 or a combination thereof, and the repeated description is omitted herein. Without causing conflicts or contradiction, the preferred modes for other embodiments may be incorporated into the present embodiment as supplement.

The present embodiment discloses a system having three participating parties. The system is suitable for executing the steps of the method of the present invention so as to achieve expected technical effects.

The first participating party: plural edge servers.

In the context of edge computing, there are usually a large number of edge servers. Each edge server saves its own data locally using SSE searchable symmetric encryption, process the keywords using the PEKS searchable public key encryption algorithm and upload the processed keywords to the cloud server as indexes for the keywords. When the user conducts search, the cloud server can identify the edge servers containing the data represented by the corresponding keywords according to the result of the PEKS search, and initiate a search request. The edge server, after receiving the search request, can decrypt the specified ciphertext and encrypt it using the user public key and then upload it to the cloud server.

Each edge server uses the symmetric encryption algorithm to save the data locally with good security, and uses the SSE algorithm to generate searchable ciphertexts of the data.

Preferably, the user doesn't have to manage the keys of the edge servers, and the edge servers may generate symmetric keys in advance according to the predetermined security parameter, wherein each edge server may have different symmetric keys.

Preferably, when the edge server generates the key, it runs $K_{SSE} \leftarrow \text{Setup}_{SSE}(s_{SSE})$ and $K_{SE} \leftarrow \text{Setup}_{SE}(s_{SE})$ to generate the SSE key $K_{SSE}$ and the SE key $K_{SE}$ respectively to obtain the symmetric key $K=(K_{SSE}, K_{SE})$.

Preferably, the edge server runs the algorithm $C_{SE} \leftarrow \text{Encrypt}_{SE}(K_{SE}, P)$ on the plaintext P of the data to generate and save its corresponding ciphertext $C_{SE}$, extracts the keyword W according to the plaintext P, inputs the document identifier $D_P$ of the plaintext data P, and runs the algorithm $CW_{SSE} \leftarrow \text{Encrypt}_{SSE}(K, D_P, W)$ to obtain SSE ciphertext $CW_{SSE}$.

According to a preferred mode, each edge server uses the keyword of the local data and the public key of the user to generate the PEKS ciphertext, and uploads it to the cloud server for the user to conduct the search. Preferably, for example, the edge server first inputs the symmetric key $K_{SE}$ and the keyword W extracted in Step 2, and runs the algorithm $CW_{SE} \leftarrow Encrypt_{SE}(K_{SE}, P)$ to obtain the encrypted keyword ciphertext $CW_{SE}$. It inputs the PEKS public key $Pk_{PEKS}$ of the user, the encrypted keyword ciphertext document identifier $D_{CW_{SE}}$, and keyword W, and runs the algorithm $CW_{PEKS} \leftarrow Encrypt_{PEKS}(Pk_{PEKS}, D_{CW_{SE}}, W)$ to obtain the PEKS searchable ciphertext of the keyword W. Afterward, the edge server takes $CW_{SE}$ as the encrypted data attached to the PEKS searchable ciphertext $CW_{PEKS}$ and uploads them to the cloud server.

According to a preferred mode, when the edge server receives the search request from the cloud server, it, according to the encrypted keyword submitted by the cloud server, conducts SSE search locally, decrypts the searched data ciphertext locally, encrypts it using the user public key and uploads it to the cloud server. Preferably, for example, when the edge server receives the request from the cloud server, it obtains the encrypted keyword $CW_{SE}$ from the request, inputs $CW_{SE}$ and the symmetric key $K_{SE}$, runs the algorithm $W \leftarrow Decrypt_{SE}(K_{SE}, CW_{SE})$, decrypts the keyword W in the request of the cloud server, inputs W and the SSE key $K_{SSE}$, and runs the algorithm $td_{SSE} \leftarrow Trapdoor_{SSE}(K_{SSE}, W)$ to obtain the corresponding SSE search trapdoor generated from the keyword locally, input $td_{SSE}$ and the ciphertext set $S_C$, and runs the algorithm $S_D \leftarrow Search_{SSE}(td_{SSE}, S_C)$ to obtain the data document identifier set $S_D$ corresponding to the keyword W.

Furthermore, the edge server, according to the document identifier set $S_D$, acquires the corresponding data ciphertext set, and inputs the SE key $K_{SE}$ and all the ciphertexts $C_{SE}$ therein, runs the algorithm $P \leftarrow Decrypt_{SE}(K_{SE}, C_{SE})$, performs decryption to acquire its corresponding plaintext P, inputs the plaintext P and the user public key $Pk_{PKE}$, runs the algorithm $C_{PKE} \leftarrow Encrypt_{PKE}(Pk_{PKE}, P)$ to obtain the PKE ciphertext $C_{PKE}$, and uploads $C_{PKE}$ to the cloud server. Since the user does not manage the private key of the edge server, it cannot decrypt the ciphertext of the edge server directly, so the edge server first has to decrypt the ciphertext locally, generate the plaintext, uses the public key of the user to encrypt the plaintext and upload it to the cloud server.

The second participating party: the cloud server.

The cloud server stores PEKS ciphertexts uploaded by plural edge servers. When a user initiates a search request, it conducts search according to the specified keyword, and finds out the edge server containing the ciphertext corresponding to the specified keyword according to the search result. Then it initiates a search request to the identified edge server. After search, the edge server uploads the data to the cloud server, and the cloud server forwards the data to the user.

According to a preferred mode, when the cloud server receives the PEKS ciphertexts ($CW_{PEKS}$, $CW_{SE}$) uploaded by plural edge servers, it saves them in a database.

Preferably, the database storing the ciphertexts supports retrieval of PEKS. When the PEKS ciphertexts are stored, the cloud server also stores identity information of the edge servers submitting these PEKS ciphertexts for later submission of requests to the edge servers. The edge server identity information may be the IP address or the domain name of an edge server.

According to a preferred mode, when the cloud server receives the PEKS trapdoor $td_{PEKS}$ submitted by a user, it performs PEKS search to identify the corresponding ciphertext and the edge server uploading the ciphertext. Then it submits the ciphertext and the public key of the user to the edge server, so as to initiate a data search request.

According to a preferred mode, the cloud server inputs the trapdoor $td_{PEKS}$ and the ciphertext set $S_{PEKS}$, runs the algorithm $S_D \leftarrow Search_{PEKS}(td_{PEKS}, S_{PEKS})$ to obtain the identifier set $S_D$ of the PEKS ciphertext, acquire each keyword ciphertext $CW_{SE}$ and information on the edge server uploading the ciphertext, and returns $CW_{SE}$ to the corresponding edge server, for the latter to conduct the SSE search.

According to a preferred mode, when the cloud server receives a data upload request from the edge server, it receives encrypted data $C_{PKE}$ from the edge server, and returns the data to the user.

The third participating party: user.

According to a preferred mode, a user submits a search request to the cloud server, and receives and decrypts the data returned by the cloud server.

According to a preferred mode, when a user wants to search a certain keyword, he/she uses the user private key to generate a PEKS trapdoor and submits it to the cloud server.

Preferably, the user public key and the user private key are generated by the user. Alternatively, the user public key and the user private key are generated by a third-party key distribution center. The user private key is kept by the user secretly. The user public key may be published. The cloud server and/or the edge server both have access to the user public key.

Preferably, when a user wants to search data related to a certain keyword W, he/she inputs W and the private key $Sk_{PEKS}$, runs the algorithm $td_{PEKS} \leftarrow Trapdoor_{PEKS}(Sk_{PEKS}, W)$ to generate its corresponding trapdoor, and submits the same to the cloud server.

According to a preferred mode, when the user receives a request from the cloud server asking for its returning data, he/she receives the data from the cloud server, uses the user private key to perform decryption, and check the data. Preferably, when the user receives the encrypted datum $C_{PKE}$ returned by the cloud server, he/she inputs $C_{PKE}$ and $Sk_{PKE}$, and runs the algorithm $P \leftarrow Decrypt_{PKE}(Sk_{PKE}, C_{PKE})$ to obtain the plaintext P of the data.

Embodiment 7

The present embodiment is further improvement based on Embodiment 1, 2, 3, 4, 5 or 6 or a combination thereof, and the repeated description is omitted herein. Without causing conflicts or contradiction, the preferred modes for other embodiments may be incorporated into the present embodiment as supplement.

According to a preferred mode, the disclosed method may further comprise a step of extracting the keyword.

Preferably, the step of extracting the keyword comprises: acquiring the data to be encrypted and identifying the format of the data to be encrypted; where the data to be encrypted is identified as a text, according to a predetermined keyword sample set, extracting the keyword from the data to be encrypted and/or acquire the keyword input by the uploader of the data; taking the extracted keyword as the keyword of the data to be encrypted; and when the data to be encrypted is identified as not a text, acquire the keyword input by the uploader of the data. Preferably, the keyword sample set comprises keywords of different levels of granularity. In this way, the keywords of the text can be obtained more efficiently and more completely, thereby preventing problems related to manual extraction of keywords such as omissions or errors. This approach also enables acquirement of keywords input by the uploader of data, making extraction of keywords more accurate and more comprehensive. For data of a non-text format, the uploader of the data can provide keywords more precisely. It is to be noted that, the keywords input by people who upload the data may comprise automatic input entries in addition to manual input entries. The automatic input entries as keywords may include time, location and identification of the people who upload the data. In another case, where the data are uploaded by traffic surveillance cameras, the data are uploaded to the edge servers in the form of videos. During uploading, the traffic surveillance cameras further generate licenses of violating cars, places of violation, times of violation, and causes of violation as keywords and send them to the edge servers as well.

While the above description has illustrated the present invention in detail, it is obvious to those skilled in the art that many modifications may be made without departing from the scope of the present invention and all such modifications are considered a part of the present disclosure. In view of the aforementioned discussion, relevant knowledge in the art and references or information that is referred to in conjunction with the prior art (all incorporated herein by reference), further description is deemed necessary. In addition, it is to be noted that every aspect and every part of any embodiment of the present invention may be combined or interchanged in a whole or partially. Also, people of ordinary skill in the art shall appreciate that the above description is only exemplificative, and is not intended to limit the present invention.

The above discussion has been provided for the purposes of exemplification and description of the present disclosure. This does not mean the present disclosure is limited to the forms disclosed in this specification. In the foregoing embodiments, for example, in order to simplify the objectives of the present disclosure, various features of the present disclosure are combined in one or more embodiments, configurations or aspects. The features in these embodiments, configurations or aspects may be combined with alternative embodiments, configurations or aspects other than those described previously. The disclosed method shall not be interpreted as reflecting the intention that the present disclosure requires more features than those expressively recited in each claim. Rather, as the following claims reflect, inventive aspects lie in less than all features of a single foregoing disclosed embodiment. Therefore, the following claims are herein incorporated into the embodiments, wherein each claim itself acts as a separate embodiment of the present disclosure.

Furthermore, while the description of the present disclosure comprises description to one or more embodiments, configurations or aspects and some variations and modifications, other variations, combinations and modifications are also within the scope of the present disclosure, for example within the scope of skills and knowledge of people in the relevant field, after understanding of the present disclosure. This application is intended to, to the extent where it is allowed, comprise rights to alternative embodiments, configurations or aspects, and rights to alternative, interchangeable and/or equivalent structures, functions, scopes or steps for the rights claimed, no matter whether such alternative, interchangeable and/or equivalent structures, functions, scopes or steps are disclosed herein, and is not intended to surrender any of the patentable subject matters to the public.

What is claimed is:

1. A method of hybrid searchable encryption, involving using at least one first computing device (1) that has a first processor (11) configured to perform steps of:

using a first symmetric key to encrypt data so as to obtain a data first ciphertext, using a second symmetric key to encrypt a keyword related to the data so as to obtain a searchable keyword first ciphertext that is related to the data first ciphertext, and saving the data first ciphertext and the searchable keyword first ciphertext in a first memory (12) of a first computing device (1); and using the first symmetric key to encrypt the keyword so as to generate a keyword second ciphertext, using a first public key to encrypt the keyword so as to obtain a searchable keyword third ciphertext related to the keyword second ciphertext, and sending the keyword second ciphertext and the searchable keyword third ciphertext to a second computing device (2);

wherein the second computing device (2) has a second processor (21) that is configured to perform steps of: receiving the keyword second ciphertext and the searchable keyword third ciphertext from the first computing device (1) and saving the two together with an identification of the first computing device (1) relationally in a second memory (22) of the second computing device (2);

wherein a third processor (31) is configured to perform steps of: upon inputting the keyword for encryption, using a first private key, where the first private key has been paired with the first public key, and the corresponding keyword to generate a first search trapdoor; and sending the first search trapdoor to the second computing device (2);

wherein the second processor (21) is further configured to perform steps of: when receiving the first search trapdoor from the third processor (31), inputting a keyword third ciphertext set composed of the first search trapdoor and a plurality of keyword third ciphertexts and outputting the corresponding keyword second ciphertext generated based on the contents of the keyword third ciphertext set, and feeding the corresponding keyword second ciphertext back to the corresponding first computing device (1) it belongs to;

wherein the first processor (11) is further configured to perform steps of: when receiving the corresponding keyword second ciphertext from the second processor (21), using the first symmetric key to do decryption and retrieve the corresponding keyword; and inputting the retrieved corresponding keyword and the second symmetric key, and generating a second search trapdoor based on the retrieved corresponding keyword and the second symmetric key; and inputting a keyword first ciphertext set composed of the second search trapdoor and a plurality of the keyword first ciphertexts, and outputting the corresponding data first ciphertext based on the contents of the keyword first ciphertext set; and inputting the corresponding data first ciphertext and the first symmetric key, and outputting a plaintext of the data related to the corresponding keyword; and inputting the plaintext of the data related to the corresponding keyword and a second public key, and outputting a corresponding data second cipher text based on the plaintext of the data and sending it to the second computing device (2); and wherein the second processor (21) is further configured to perform steps of: receiving the corresponding data second ciphertext and forwarding it to a third computing device (3).

2. The method of claim 1, wherein the third processor (31) is further configured to perform steps of:

receiving the corresponding data second ciphertext from the second processor (21) and saving it in a third memory (32); and inputting the corresponding data second ciphertext and a second private key paired with the second public key, and decrypting and outputting the plaintext of the corresponding data related to the corresponding keyword based on the corresponding data second ciphertext and a second private key.

3. The method of claim 1, wherein the first processor (11) of each first computing device (1) is configured to perform a step of: independently generating the first symmetric key and/or the second symmetric key.

4. The method of claim 1, wherein the first processor (11) of each first computing device (1) is configured to perform a step of: independently generating the first symmetric key and/or the second symmetric key.

5. The method of claim 1, wherein the first processor (11) of each first computing device (1) is configured to perform a step of: independently generating the first symmetric key and/or the second symmetric key.

6. The method of claim 1, wherein the first processor (11) of each first computing device (1) is configured to perform a step of: independently generating the first symmetric key and/or the second symmetric key.

7. The method of claim 1, wherein the first processor (11) of each first computing device (1) is configured to perform a step of: independently generating the first symmetric key and/or the second symmetric key.

8. The method of claim 2, wherein the first processor (11) of each first computing device (1) is configured to perform a step of: independently generating the first symmetric key and/or the second symmetric key.

9. The method of claim 1, wherein the first computing device (1) is an edge server, and the second computing device (2) is a cloud server, while the third computing device (3) is a user device.

10. A system of hybrid searchable encryption comprising a first computing device (1), a second computing device (2), and a third computing device (3), wherein the system comprises at least one first computing device (1), the first computing device (1) has a first processor (11) configured to perform steps of:

using a first symmetric key to encrypt data so as to obtain a data first ciphertext, using a second symmetric key to encrypt a keyword related to the data so as to obtain a searchable keyword first ciphertext that is related to the data first ciphertext, and saving the data first ciphertext and the searchable keyword first ciphertext in a first memory (12) of a first computing device (1); and using the first symmetric key to encrypt the keyword so as to generate a keyword second ciphertext, using a first public key to encrypt the keyword so as to obtain a searchable keyword third ciphertext related to the keyword second ciphertext, and sending the keyword second ciphertext and the searchable keyword third ciphertext to a second computing device (2);

wherein the second computing device (2) has a second processor (21) that is configured to perform steps of: receiving the keyword second ciphertext and the searchable keyword third ciphertext from the first computing device (1) and saving the two together with an identification of the first computing device (1) relationally in a second memory (22) of the second computing device (2) wherein a third processor (31) is configured to perform steps of: upon inputting the keyword for encryption, using a first private key, where the first private key has been paired with the first public key, and the corresponding keyword to generate a first search trapdoor; and sending the first search trapdoor to the second computing device (2);

wherein the second processor (21) is further configured to perform steps of: when receiving the first search trapdoor from the third processor (31), inputting a keyword third ciphertext set composed of the first search trapdoor and a plurality of keyword third ciphertexts and outputting the corresponding keyword second ciphertext generated based on the contents of the keyword third ciphertext set, and feeding the corresponding keyword second ciphertext back to the corresponding first computing device (1) it belongs to;

wherein the first processor (11) is further configured to perform steps of: when receiving the corresponding keyword second ciphertext from the second processor (21), using the first symmetric key to do decryption and retrieve the corresponding keyword; and inputting the retrieved corresponding keyword and the second symmetric key, and generating a second search trapdoor based on the retrieved corresponding keyword and the second symmetric key; and inputting a keyword first ciphertext set composed of the second search trapdoor and a plurality of the keyword first ciphertexts, and outputting the corresponding data first ciphertext based on the contents of the keyword first ciphertext set and inputting the corresponding data first ciphertext and the first symmetric key, and outputting a plaintext of the data related to the corresponding keyword; and inputting the plaintext of the data related to the corresponding keyword and a second public key, and outputting a corresponding data second cipher text based on the plaintext of the data and sending it to the second computing device (2); and wherein the second processor (21) is further configured to perform steps of: receiving the corresponding data second ciphertext and forwarding it to a third computing device (3).

\* \* \* \* \*